United States Patent
Leibowitz et al.

(10) Patent No.: US 9,002,870 B2
(45) Date of Patent: Apr. 7, 2015

(54) SYSTEM, METHOD AND COMPUTER PROGRAM PRODUCT FOR EDI-TO-EDI TRANSLATIONS

(75) Inventors: Eric Leibowitz, Rockville, MD (US); Eric Nilson, Annandale, VA (US)

(73) Assignee: Sybase, Inc., Dublin, CA (US)

( * ) Notice: Subject to any disclaimer, the term of this patent is extended or adjusted under 35 U.S.C. 154(b) by 978 days.

(21) Appl. No.: 11/802,390

(22) Filed: May 22, 2007

(65) Prior Publication Data
US 2008/0294645 A1 Nov. 27, 2008

(51) Int. Cl.
*G06F 17/30* (2006.01)

(52) U.S. Cl.
CPC .................. *G06F 17/30569* (2013.01)

(58) Field of Classification Search
None
See application file for complete search history.

(56) References Cited

U.S. PATENT DOCUMENTS

| | | | |
|---|---|---|---|
| 5,202,977 A * | 4/1993 | Pasetes et al. .................. 703/27 |
| 5,557,780 A * | 9/1996 | Edwards et al. ................ 703/27 |
| 6,230,201 B1 * | 5/2001 | Guck et al. ..................... 709/228 |
| 6,408,303 B1 * | 6/2002 | Richards ............................... 1/1 |
| 7,281,211 B2 * | 10/2007 | Jeannette et al. ............. 715/234 |
| 7,340,426 B1 * | 3/2008 | Frutuoso et al. ................ 705/37 |
| 2002/0049790 A1 * | 4/2002 | Ricker et al. ................... 707/513 |
| 2002/0099735 A1 * | 7/2002 | Schroeder et al. ............ 707/513 |
| 2004/0025167 A1 * | 2/2004 | Grow et al. ................... 719/310 |
| 2007/0203926 A1 * | 8/2007 | Gaurav et al. ................. 707/101 |
| 2008/0059577 A1 * | 3/2008 | Kalia et al. .................... 709/204 |
| 2008/0222517 A1 * | 9/2008 | Halim et al. .................. 715/236 |

* cited by examiner

*Primary Examiner* — Son T Hoang
(74) *Attorney, Agent, or Firm* — Sterne, Kessler, Goldstein & Fox P.L.L.C.

(57) ABSTRACT

For the purpose of mapping an inbound Electronic Data Interchange (EDI) transaction to one or more outputs there are operations comprising receiving an inbound EDI transaction, and translating the inbound EDI transaction to any combination of EDI outbound transactions and non-EDI outbound transactions. Such translation is performed according to a map file, which is generated as follows. The inbound and any outbound EDI transactions are defined, and templates of the inbound and outbound EDI transactions are also defined. Then, mappings between the template of the inbound EDI transaction and the templates of the outbound EDI transactions are defined. A mapping between the inbound EDI transaction and application data may also be defined, where the application data may include a text file, a XML file, and/or a table of a database. Rules relating to or governing the mapping of the inbound EDI transaction to outputs may also be created. These definitions, mappings and rules are stored in the map file.

16 Claims, 10 Drawing Sheets

SYSTEM, METHOD AND COMPUTER PROGRAM PRODUCT FOR EDI-TO-EDI TRANSLATIONS

BACKGROUND OF THE INVENTION

1. Field of the Invention

The present invention is generally directed to processing EDI (Electronic Data Interchange) transactions, and more specifically directed to translating from an inbound EDI transaction to one or more outbound EDI transactions and/or other outputs.

2. Background Art

Electronic Data Interchange (EDI) is a set of standards for structuring information to be electronically exchanged between organizations (often called "trading partners"). In essence, EDI standards represent common languages through which trading partners may electronically communicate. Existing EDI standards include X12, HL7 and EDIFACT.

While EDI has helped to standardize electronic communication between organizations, challenges still exist. For example, organizations who wish to electronically communicate may not support or use the same EDI standard. In other cases, organizations may use the same EDI standard, but not the same version of the standard. In such cases, EDI messages must be translated from the EDI standard/version used by the sender to the EDI standard/version used by the receiver.

Also, there are instances where a given EDI transaction must be forwarded to a number of trading partners. Such destination trading partners may support different EDI standards/versions (relative to the sender, and/or to each other). Accordingly, it is necessary to translate the inbound EDI transaction to forms that are compatible with the destination trading partners.

Conventional approaches for translating EDI transactions, particularly when a given EDI transaction must be translated to forms compatible with multiple trading partners, are cumbersome, time-consuming and inefficient. Therefore, what is needed are improved systems, methods and computer program products for translating an inbound EDI transaction to forms compatible with one or more destination trading partners.

BRIEF SUMMARY OF THE INVENTION

The present invention is directed to systems, methods and computer program products for mapping an inbound EDI transaction to one or more outputs. An embodiment of the invention operates by receiving an inbound EDI transaction, and translating the inbound EDI transaction to any combination of EDI outbound transactions and non-EDI outbound transactions. Such translation is performed according to a map file.

In an embodiment, the map file is generated as follows. The inbound and any outbound EDI transactions are defined, and templates of the inbound and outbound EDI transactions are also defined. Then, mappings between the template of the inbound EDI transaction and the templates of the outbound EDI transactions are defined. A mapping between the inbound EDI transaction and application data may also be defined, where the application data may include a text file, a XML file, and/or a table of a database. Rules relating to or governing the mapping of the inbound EDI transaction to outputs may also be created. These definitions, mappings and rules are stored in the map file.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 4-9 are example user interfaces used to describe the flowchart of FIG. 3.

Figure 1:
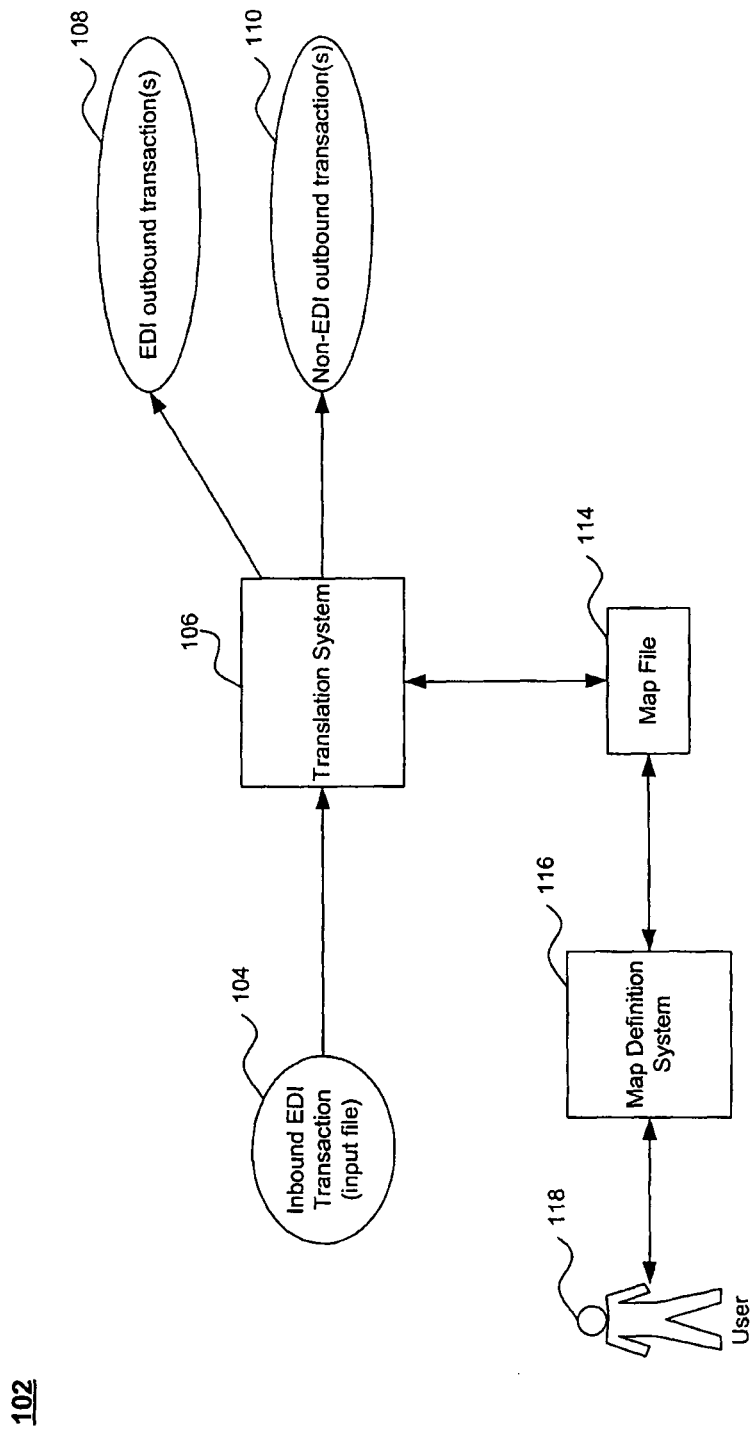
FIG. 1 illustrates an example environment according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

The present invention is directed to systems, methods and computer program products for translating an input EDI transaction to one or more outputs. The input EDI transaction may be in any well known EDI standard, such as X12, HL7 and EDIFACT, as well as any other EDI standard now existing or developed in the future.

The invention translates the input EDI transaction to any number of outputs. In practice, the number of outputs is limited only by system resources, such as system memory. In an embodiment, the invention supports up to 99 outputs.

Any of the outputs can be an EDI transaction in any of the EDI standards, now existing or developed in the future. Any output can be of the same or different standard relative to the input, can be of a different version of the same standard relative to the input, can be a different transaction in the same standard as the input, or can be a user defined transaction that is not in any EDI standard.

In addition, the input EDI transaction can be mapped to one or more text files, one or more XML files, and/or one or more tables in one or more ODBC databases. Other forms of the output are possible, as described below, and as will be apparent to persons skilled in the relevant art(s) based on the teachings contained herein.

For example, a given EDI to EDI translation run can consist of:

Input: X12 file.

Output 1: X12 file (same EDI standard, same version, a first different transaction).

Output 2: X12 file (same EDI standard, different version, a second different transaction, plus an XML file and text files).

Output 3: X12 file (same EDI standard, different version, a third different transaction).

Output 4: EDIFACT file (different standard, plus tables in an ODBC database, text files and an XML file).

Output 5: EDIFACT file (different standard, another transaction).

Output 6: HL7 file (different standard, plus a XML file).

Output 7: HL7 file (different standard, another transaction).

As noted above, embodiments of the invention also support mapping to user defined standards. In embodiments, the user defined standard must have the basic required standard header and trailer envelope segments that either a X12, HL7 or EDIFACT transaction would have. For example, a X12 transaction requires the leading ISA, GS, ST segments and corresponding SE, GE and IEA segments. For X12, the first segment must be an ISA, the second segment must be a GS, and the third segment must be an ST. Thereafter, the user may add any non-standard segments, but each ST and user defined segment must be followed by a SE segment. After the SE segment, either another ST is required, or a GE, GS or GE, IEA is required. The user may add entirely new segments from the Segment and element libraries and place these segments in any order (between standard X12 ST and SE segments) to create user-defined transactions.

FIG. 1 illustrates an environment 102 according to an embodiment of the invention. FIG. 1 shall be described with reference to an operational flowchart 202 shown in FIG. 2.

Figure 2:
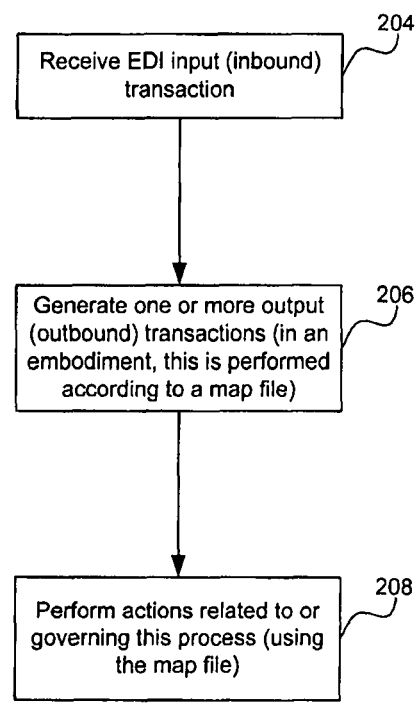
FIG. 2 illustrates a flowchart for translating an inbound EDI transaction to one or more outputs, according to an embodiment of the invention.

A translation system 106 receives an inbound EDI transaction 104 (step 204 of FIG. 2). The inbound EDI transaction 104 may be in any well known form, such as but not limited to a file read from a storage device, data received from a sending trading partner, data received over a wired or wireless communication medium, etc. The translation system 106 translates the inbound EDI transaction 104 to one or more outputs (step 206). Such outputs may include EDI outbound transaction(s) 108 and non-EDI outbound transaction(s) 110 (such as user-defined transactions, text files, tables in a database, XML files, application data, etc.), and any combinations thereof. The outputs may be in any well known form, such as but not limited to files stored in a storage device, data sent to trading partners, data transmitted over a wired or wireless communication medium, etc., as well as any combinations thereof.

According to an embodiment of the invention, translation system 106 operates as just described according to a map file 114. The map file 114 contains instructions that specify the outputs that are to be created, and the manner in which the input is to be mapped to those outputs. The translation system 106 reads and processes the instructions in the map file 114 to generate the outputs 108, 110 from the inbound EDI transaction 104. Thus, according to an embodiment, the invention enables the generation of multiple outputs 108, 110 from a single input 104 using a single set of instructions contained in the map file 114, thereby greatly simplifying the translation of an inbound EDI transaction to multiple outputs. In an embodiment, users 118 generate the map file 114 using a map definition system 116.

The translation system 106 may also perform additional actions related to or governing the translation process (step 208). These additional actions are also specified by the instructions contained in the map file 114. Such additional actions may include, for example, writing data to user applications, writing data to files, writing data to databases, data format checking, virus checking, as well as any other user defined actions.

Figure 3:
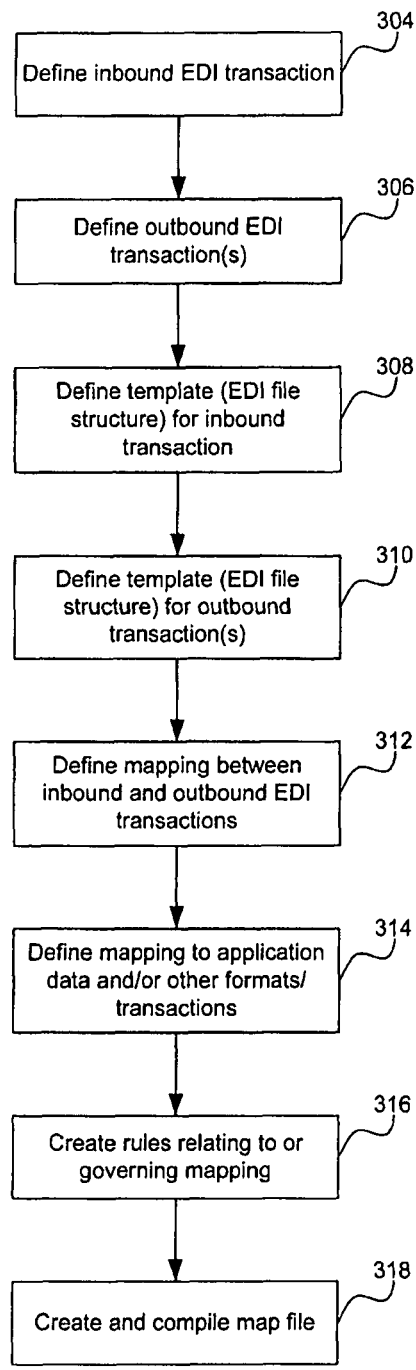
FIG. 3 illustrates a flowchart for generating a mapping between an inbound EDI transaction and one or more outputs, according to an embodiment of the invention.

FIG. 3 illustrates a process 302 for generating a map file 114 according to an embodiment of the invention. In an embodiment, one or more users 118 generate the map file 114 using map definition system 116. In an embodiment, map definition system 116 is a computer on which a map definition program executes. The map definition program generates and displays a graphical user interface (GUI) for facilitating the creation of the map file 114. A portion of an example GUI is illustrated in FIGS. 4-9. The process 302 of FIG. 3 shall be described with reference to the example GUI illustrated in FIGS. 4-9. It is noted that the steps of process 302 may be performed in a different order in alternative embodiments of the invention.

Figure 4:
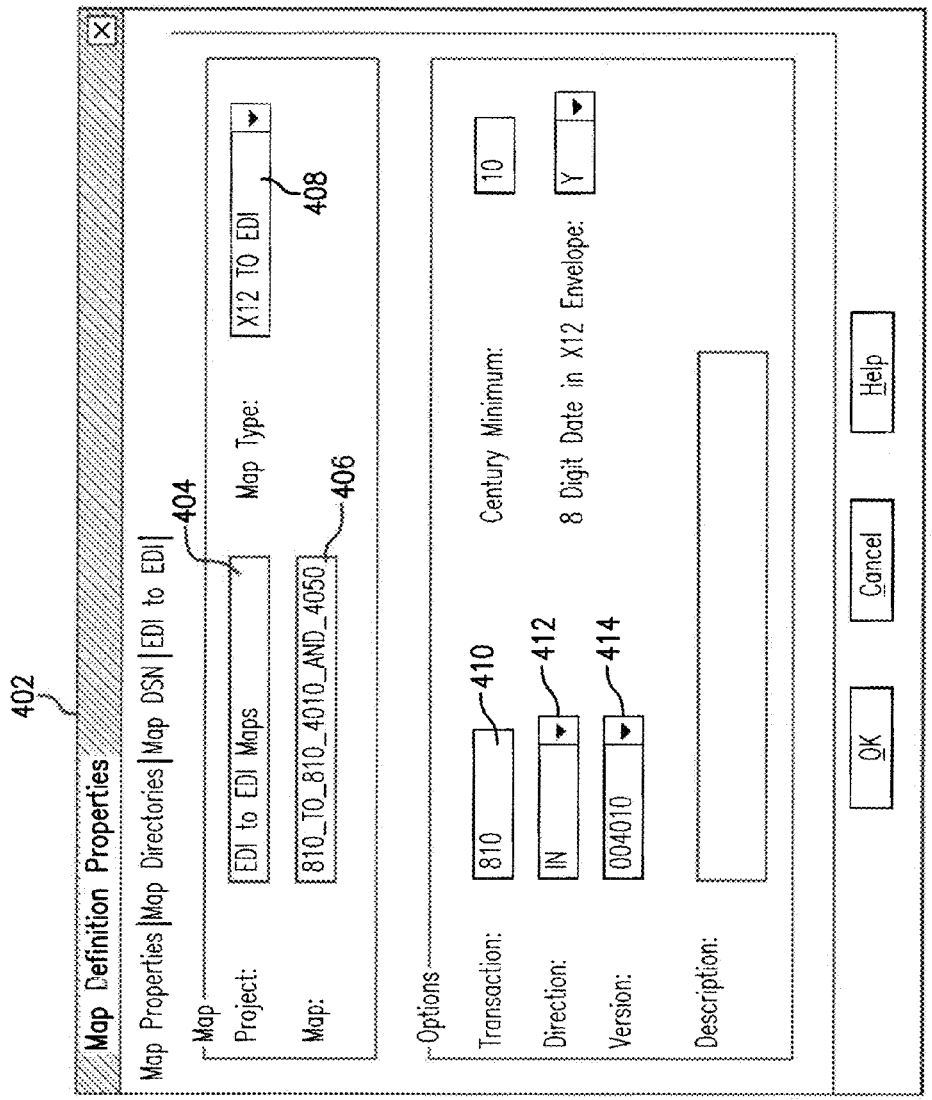

In step 304, the inbound EDI transaction is defined. FIG. 4 illustrates an example user interface 402 useful for performing this step (it is noted that, in some embodiments, user 118 enters the information described below on separate screens). User 118 enters a project name and a map description in fields 404 and 406, respectively. User 118 specifies that the transaction being defined is an inbound transaction via field 412.

User 118 specifies the EDI standard of the input via a drop down list 408. In the example of FIG. 4, user 118 has selected X12 as the EDI standard of the inbound EDI transaction. The user 118 could have instead selected another EDI standard, such as HL7 or EDIFACT, or could have indicated that the input was a non-EDI standard.

As is well known, any given EDI standard may have multiple versions. Also, every version of every EDI standard has multiple transactions. User 118 specifies the version of the EDI standard in field 414. User 118 specifies the transaction in field 410. Accordingly, in the example of FIG. 4, user 118 has selected transaction 810 of version 4010 of the X12 standard. This transaction 810 corresponds to an invoice.

Figure 5:
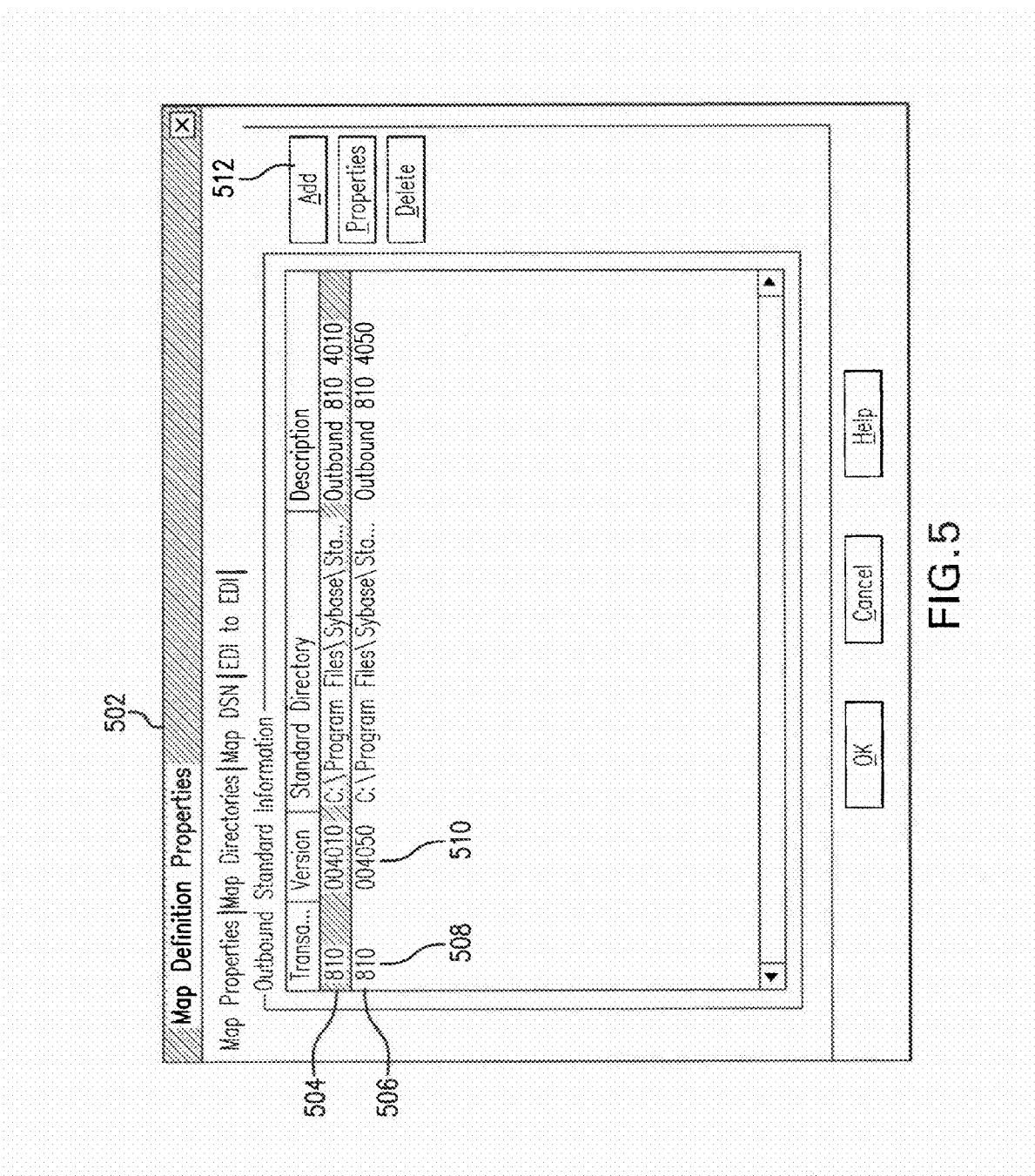

In step 306, the outbound EDI transactions (if any) are defined. FIG. 5 illustrates an example user interface 502 useful for performing this step. User 118 clicks the "Add" button to create a new outbound EDI transaction. User 118 then enters the standard, version and transaction of the new outbound EDI transaction. The example of FIG. 5 shows that user 118 has created two outbound EDI transactions 504, 506. While not explicitly indicated in the example user interface 502 of FIG. 5, both outbound EDI transactions 504, 506 are of the X12 standard, the same as the input. Also, both are transaction 810, again the same as the input. One of the outbound EDI transactions is version 4010 of the X12 standard (the same as the input). The other outbound EDI transaction is version 4050 of the X12 standard (a different version relative to the input).

Figure 6:
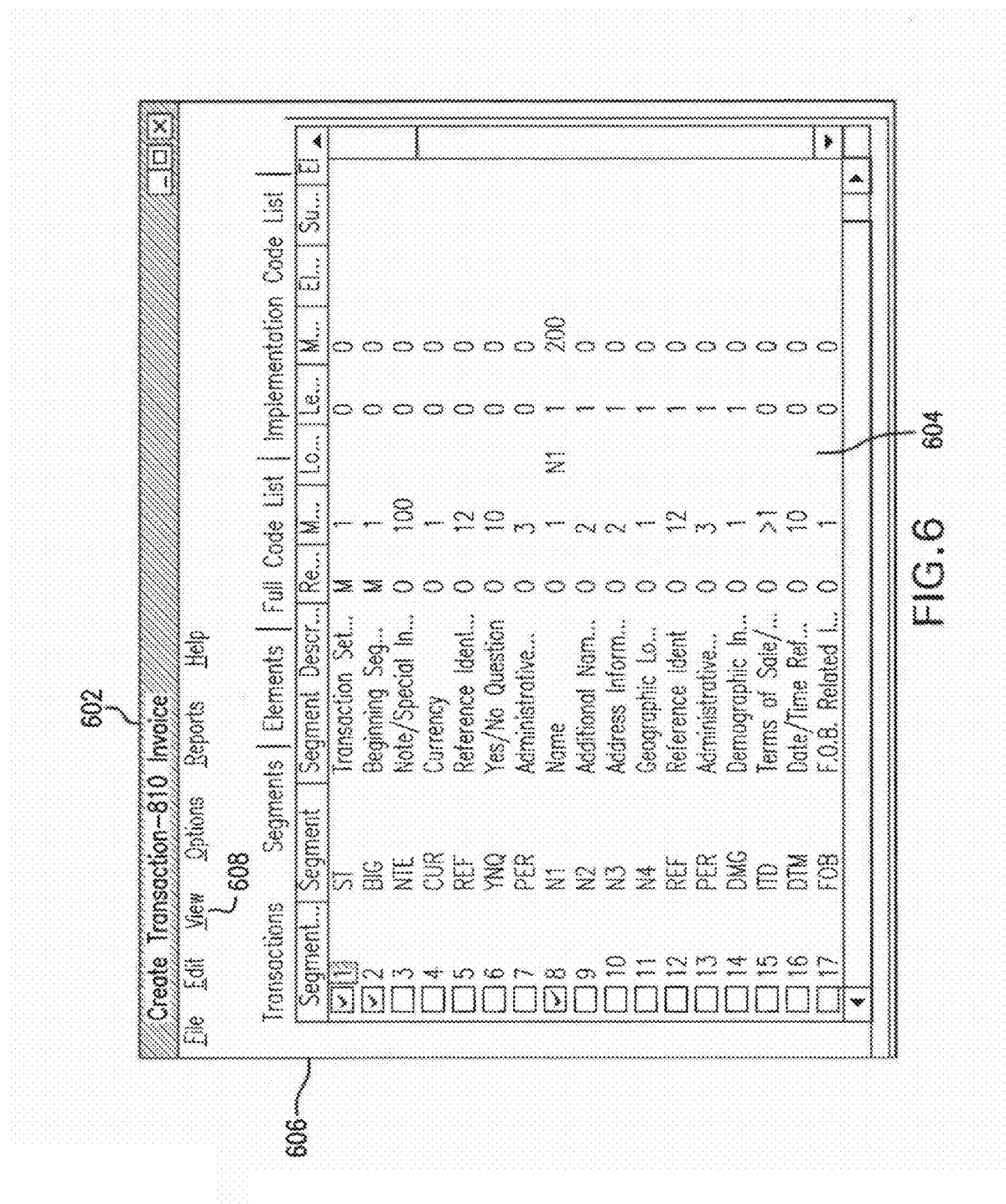

In step 308, the template (EDI file structure) of the inbound EDI transaction is defined. FIG. 6 illustrates an example user interface 602 useful for performing this step. As is well known, any given EDI transaction may contain a number of segments, and each segment may contain a number of elements. These segments and elements of the input transaction are displayed in user interface 602. User 118 may include any combination of these segments and elements in the inbound transaction being defined by checking the corresponding check boxes 606. By allowing the user 118 to select any combination of the transaction's segments and elements for the inbound EDI transaction, the invention enables the user 118 to better adapt the inbound EDI transaction to the internal operations of the sending and receiving trading partners. (It is noted that in some embodiments, including that shown in FIG. 6, user 118 is allowed to select segments, but not individual elements.)

In step 310, the templates (EDI file structures) of the outbound EDI transactions are defined. The example user interface 602 of FIG. 6 is useful for performing this step. For each outbound EDI transaction, user 118 may include any combination of the transaction's segments and elements by checking the corresponding check boxes 606. By allowing the user 118 to select any combination of the transaction's segments and elements for each outbound EDI transaction, the invention enables the user 118 to better adapt the outbound EDI transactions to the internal operations of the sending and receiving trading partners. (Again, it is noted that in the example embodiment of FIG. 6, user 118 is allowed to select segments, but not individual elements.)

Figure 7:
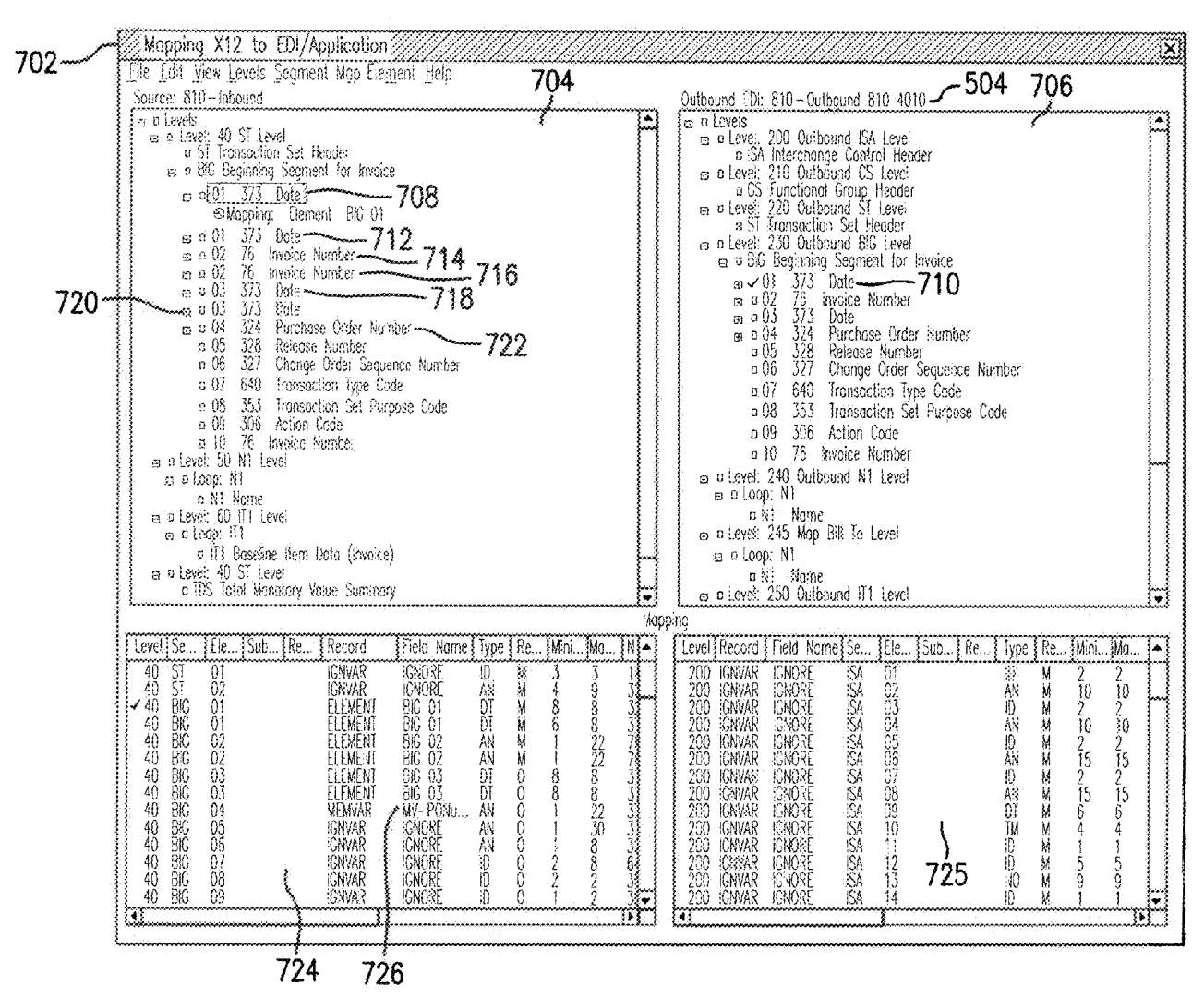

In step 312, the mapping between the inbound EDI transaction and each outbound EDI transaction is defined. FIG. 7 illustrates an example user interface 702 useful for performing this step. A first window 704 shows the structure of the inbound EDI transaction (as defined in step 308). A second window 706 shows the structure of one of the outbound EDI transactions 504 (as defined in step 310). To map a segment or element of the inbound to a segment or element of the outbound, user 118 selects the segment/element in the inbound window 704, and then selects the corresponding segment/element in the outbound window 706 (alternatively, user 118 can select the segment/element in the outbound window 706, and then select the corresponding segment/element in the inbound window 704). In the example of FIG. 7, element 708 in inbound window 704 has been mapped to element 710 in outbound window 706. In an embodiment, this is accomplished by dragging a segment/element from one window 704 or 706 to the desired segment/element in the other window 706 or 704. In some embodiments, user 118 is permitted to only map to elements, not segments.

Figure 8:
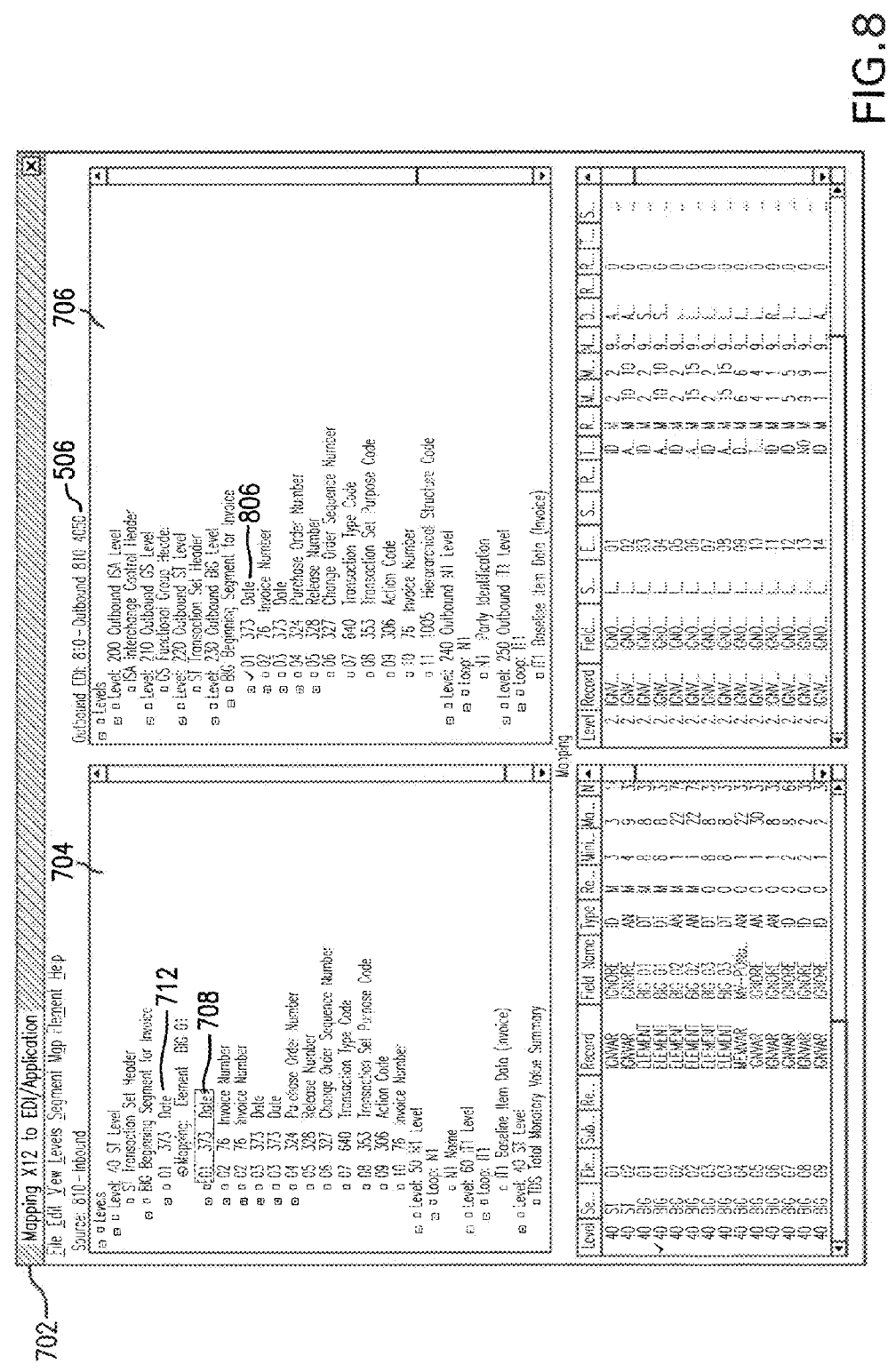

FIG. 8 illustrates the user interface 702 where the inbound EDI transaction is being mapped to the other outbound EDI transaction 506. In the example of FIG. 8, element 712 in inbound window 704 has been mapped to element 806 in outbound window 706.

In an embodiment, since there are two outbound transactions 504, 506, the inbound window 704 must include two instances of each segment/element that is being mapped to both outbound transactions 504, 506. In the embodiment of FIG. 7, for example, there are two instances of the Date 01 element 708, 712, two instances of the Invoice Number element 714, 716, and two instances of the Date 03 element 718, 720. In an embodiment, user 118 is required to create these segment/element instances in the inbound window 704.

Alternatively, an embodiment of the invention permits the use of storage locations called memory variables. User 118 may assign any segment/element to a memory variable. For example, in FIG. 7, user 118 has assigned Purchase Order Number element 722 to a memory variable (see 726 in the detail window 724). By doing so, user 118 need not create an instance of the inbound segment/element for each outbound transaction to which the inbound segment/element is mapped. Instead, the memory variable is mapped to the corresponding segment/element in all of the outbound transactions.

Figure 9:
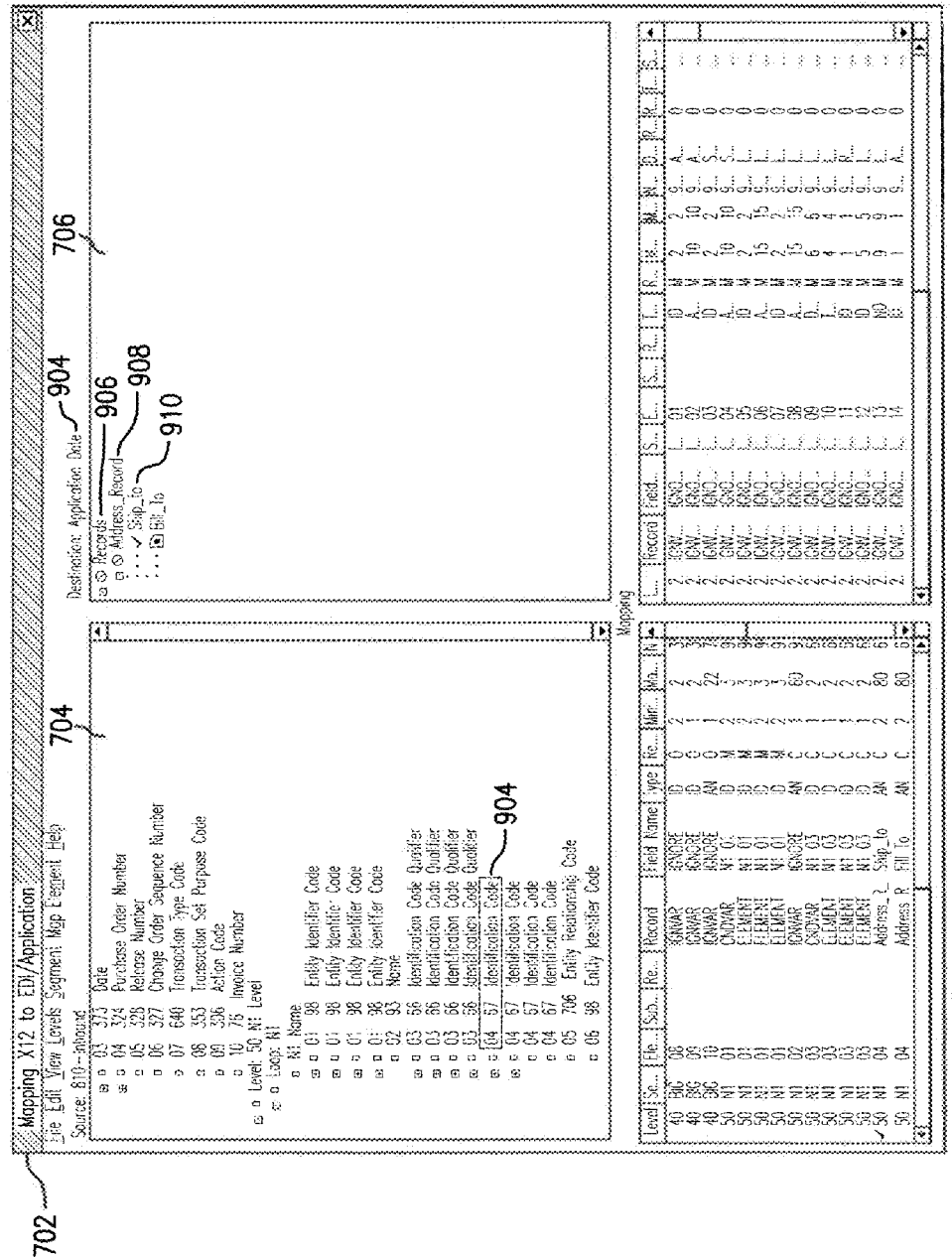

In step 314, mappings between the inbound EDI transaction and other outputs are defined. For example, the inbound EDI transaction can be mapped to application data, text files, XML files, databases, as well as any other desired output. FIG. 9 illustrates the example user interface 702 where the inbound EDI transaction is being mapped to application data 904, which could represent a database record 906, for example. In the example of FIG. 9, an Identification Code element 904 in the inbound window 704 has been mapped to a Ship_to element 910 in the outbound window 706.

In step 316, user 118 can create additional rules relating to or governing the mapping process described above. Such additional rules may relate to, for example, writing data to user applications, writing data to files, writing data to databases, data format checking, as well as any other user defined actions.

In step 318, the definitions, mappings and rules specified in steps 304-316 are written to a map file 114 in any form that is readable by translation system 106. In an embodiment, the information user 118 enters during development (steps 304-316) is stored in databases. When user 118 completes the mapping process (including adding rules, etc.), user 118 generates/compiles the map file 114. This file 114 contains all the information the user 118 entered per the process 302 just described. The map file 114 is encoded in a format that a separate run time program 106 reads in conjunction with a file 104 to create the desired outputs 108, 110.

It is noted that multiple map files 114 may exist and be active at any given time. When translation system 106 receives an inbound EDI transaction 104, translation system 106 accesses the appropriate map file 114 and translates the inbound EDI transaction 104 according to such map file 114. The map file 114 may be selected, for example, based on a match with the standard/version/transaction of the inbound transaction 104, or by any other user-defined means.

Figure 10:
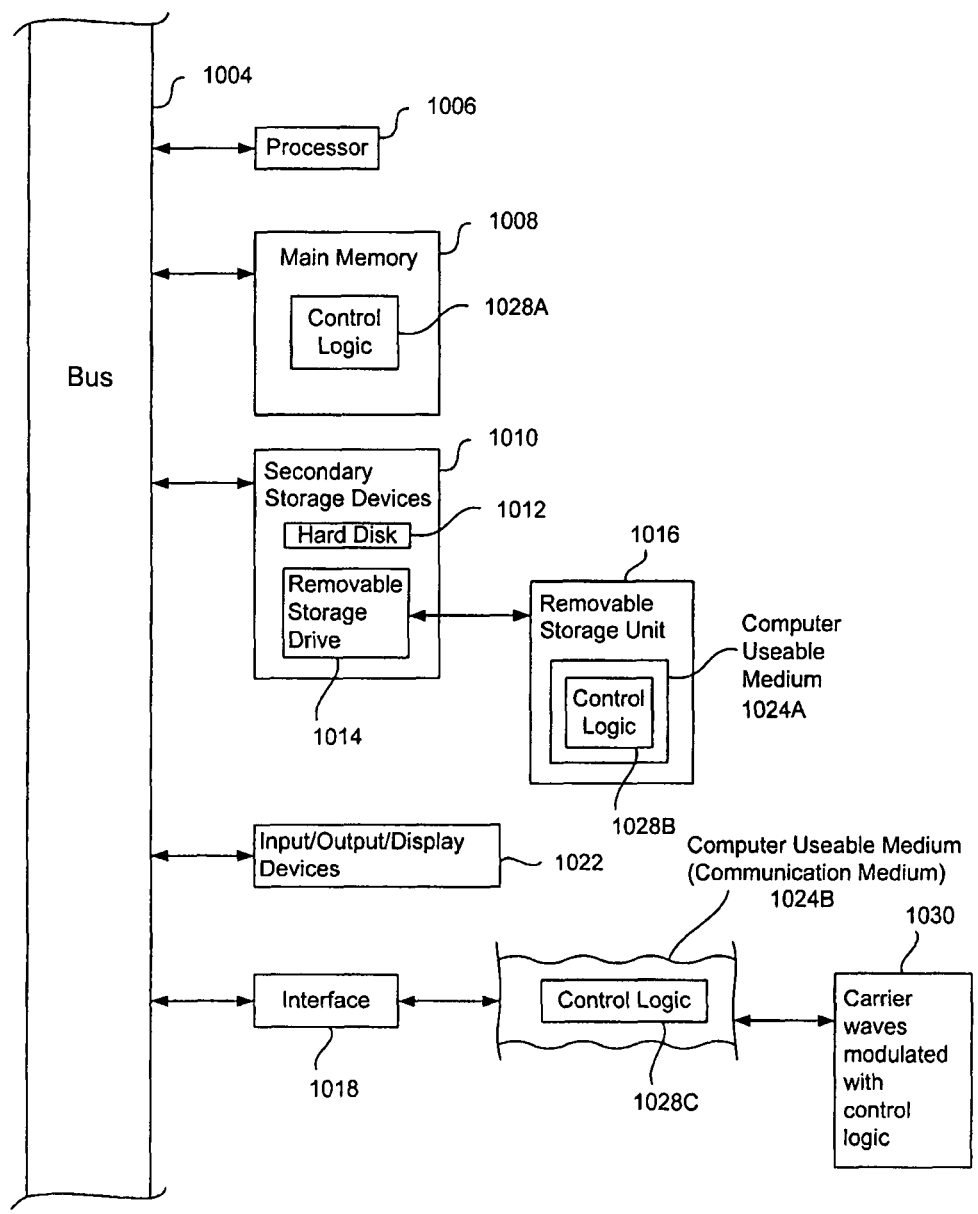
FIG. 10 illustrates an example computer useful for implementing components of the invention.

In an embodiment of the present invention, the system and components of the present invention described herein are implemented using well known computers, such as computer 1002 shown in FIG. 10. For example, translation system 106 and map definition system 116 can be implemented using computer(s) 1002.

The computer 1002 can be any commercially available and well known computer capable of performing the functions described herein, such as computers available from International Business Machines, Apple, Sun, HP, Dell, Compaq, Digital, Cray, etc.

The computer 1002 includes one or more processors (also called central processing units, or CPUs), such as a processor 1006. The processor 1006 is connected to a communication bus 1004.

The computer 1002 also includes a main or primary memory 1008, such as random access memory (RAM). The primary memory 1008 has stored therein control logic 1028A (computer software), and data.

The computer 1002 also includes one or more secondary storage devices 1010. The secondary storage devices 1010 include, for example, a hard disk drive 1012 and/or a removable storage device or drive 1014, as well as other types of storage devices, such as memory cards and memory sticks. The removable storage drive 1014 represents a floppy disk drive, a magnetic tape drive, a compact disk drive, an optical storage device, tape backup, etc.

The removable storage drive 1014 interacts with a removable storage unit 1016. The removable storage unit 1016 includes a computer useable or readable storage medium 1024 having stored therein computer software 1028B (control logic) and/or data. Removable storage unit 1016 represents a floppy disk, magnetic tape, compact disk, DVD, optical storage disk, or any other computer data storage device. The removable storage drive 1014 reads from and/or writes to the removable storage unit 1016 in a well known manner.

The computer 1002 also includes input/output/display devices 1022, such as monitors, keyboards, pointing devices, etc.

The computer 1002 further includes a communication or network interface 1018. The network interface 1018 enables the computer 1002 to communicate with remote devices. For example, the network interface 1018 allows the computer 1002 to communicate over communication networks or mediums 1024B (representing a form of a computer useable or readable medium), such as LANs, WANs, the Internet, etc. The network interface 1018 may interface with remote sites or networks via wired or wireless connections.

Control logic 1028C may be transmitted to and from the computer 1002 via the communication medium 1024B. More particularly, the computer 1002 may receive and transmit carrier waves (electromagnetic signals) modulated with control logic 1030 via the communication medium 1024B.

Any apparatus or manufacture comprising a computer useable or readable medium having control logic (software) stored therein is referred to herein as a computer program product or program storage device. This includes, but is not limited to, the computer 1002, the main memory 1008, secondary storage devices 1010, the removable storage unit 1016 and the carrier waves modulated with control logic 1030. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of mapping an inbound electronic data interchange (EDI) transaction to one or more outputs, comprising:
receiving the inbound EDI transaction;
automatically selecting a map file upon receipt of the inbound EDI transaction, the map file selected based on pre-defined matching criteria between the inbound EDI transaction and the map file; and
translating the inbound EDI transaction to any an output combination of at least one EDI outbound transactions and at least one user-defined outbound transaction, wherein
the at least one user-defined outbound transaction being generated upon completion of the translating, includes a user-defined transaction having standard EDI header and trailer envelope segments but does not qualify as a standard EDI transaction
the translating is performed according to the map file, the map file including one or more executable instructions to perform pre-defined actions using respective applications during the translating.

2. The method of claim 1, further comprising:
defining the inbound EDI transaction;
defining any outbound EDI transactions;
defining a template of the inbound EDI transaction;
defining templates of the outbound EDI transactions; and
defining a mapping between the template of the inbound EDI transaction and the templates of the outbound EDI transactions,
wherein the transaction templates and mapping definitions are stored in the map file.

3. The method of claim 2, further comprising:
defining a mapping between the inbound EDI transaction and application data, wherein the application data is a subset of the at least one user-defined outbound transaction.

4. The method of claim 3, wherein the application data comprises at least one of a text file, an extensible markup language (XML) file, and a table of a database.

5. The method of claim 3, further comprising:
creating rules relating to or governing the mapping of the inbound EDI transaction to the output combination.

6. The method of claim 1, wherein the at least one user-defined transactions includes non-standard EDI segments.

7. A computer-based system for mapping an inbound electronic data interchange (EDI) transaction to one or more outputs, comprising:
one or more computer-based processors;
a first module configured to receive the inbound EDI transaction;
a second module configured to automatically select a map file upon receipt of the inbound EDI transaction, the map file selected based on pre-defined matching criteria between the inbound EDI transaction and the map file; and
a third module configured to translate according to the map file the inbound EDI transaction to an output combination of at least one EDI outbound transactions and at least one user-defined outbound transaction, wherein
the user-defined outbound transaction being generated upon completion of the translating, include a user-defined transaction having standard EDI header and trailer envelope segments but does not qualify as a standard EDI transaction, and
the map file including one or more executable instructions to perform pre-defined actions using respective applications during the translating,
the first module, the second module, and the third module are executed by the one or more computer-based processors of the system.

8. The system of claim 7, further comprising:
a fourth module configured to define the inbound EDI transaction;
a fifth module configured to define any outbound EDI transactions;
a sixth module configured to define a template of the inbound EDI transaction;
a seventh module configured to define templates of the outbound EDI transactions; and
an eighth module configured to define a mapping between the template of the inbound EDI transaction and the templates of the outbound EDI transactions,
wherein the transaction templates and mapping definitions are stored in the map file.

9. The system of claim 8, further comprising:
a ninth module configured to define a mapping between the inbound EDI transaction and application data, wherein the application data is a subset of the at least one user-defined outbound transaction.

10. The system of claim 9, wherein the application data comprises at least one of a text file, an extensible markup language (XML) file, and a table of a database.

11. The system of claim 9, further comprising:
tenth module configured to create rules relating to or governing the mapping of the inbound EDI transaction to the output combination.

12. An article of manufacture including a non-transitory computer-readable storage medium having instructions stored thereon that, when executed by a processing device, cause the processing device to perform operations comprising:
receiving the inbound EDI transaction;
automatically selecting a map file upon receipt of the inbound EDI transaction, the map file selected based on pre-defined matching criteria between the inbound EDI transaction and the map file; and
translating the inbound EDI transaction to an output combination of at least one EDI outbound transactions and at least one user-defined outbound transaction, wherein
the at least one user-defined outbound transaction being generated upon completion of the translating, includes a user-defined transaction having standard EDI header and trailer envelope segments but does not qualify as a standard EDI transaction
the translating is performed according to the map file, the map file including one or more executable instructions to perform pre-defined actions using respective applications during the translating.

13. The article of manufacture of claim 12, the operations further comprising:
defining the inbound EDI transaction;
defining any outbound EDI transactions;
defining a template of the inbound EDI transaction;
defining templates of the outbound EDI transactions; and
defining a mapping between the template of the inbound EDI transaction and the templates of the outbound EDI transactions,
wherein the transaction templates and mapping definitions are stored in the map file.

14. The article of manufacture of claim 13, the operations further comprising:
defining a mapping between the inbound EDI transaction and application data, wherein the application data is a subset of the at least one user-defined outbound transaction.

15. The article of manufacture of claim 14, wherein the application data comprises at least one of a text file, an extensible markup language (XML) file, and a table of a database.

16. The article of manufacture of claim 14, the operations further comprising:
creating rules relating to or governing the mapping of the inbound EDI transaction to the output combination.

* * * * *